US012789723B2

(12) United States Patent
Short

(10) Patent No.: US 12,789,723 B2
(45) Date of Patent: Nov. 10, 2026

(54) VEHICLE-INTEGRATED-BIODEGRADABLE TOILET SYSTEM

(71) Applicant: Wendy Lee Short, Orlando, FL (US)

(72) Inventor: Wendy Lee Short, Orlando, FL (US)

( * ) Notice: Subject to any disclaimer, the term of this patent is extended or adjusted under 35 U.S.C. 154(b) by 0 days.

(21) Appl. No.: 19/457,531

(22) Filed: Jan. 23, 2026

(65) Prior Publication Data

US 2026/0346798 A1 Nov. 5, 2026

Related U.S. Application Data

(60) Provisional application No. 63/799,031, filed on May 2, 2025.

(51) Int. Cl.
*B60R 15/04* (2006.01)
*E03D 11/00* (2006.01)

(52) U.S. Cl.
CPC .............. *B60R 15/04* (2013.01); *E03D 11/00* (2013.01)

(58) Field of Classification Search
CPC ........... B60R 15/04; E03D 11/00; E03D 1/00; E03D 3/00; E03D 5/00; E03D 9/10
USPC ............................................ 4/321, 300, 315
See application file for complete search history.

(56) References Cited

U.S. PATENT DOCUMENTS 1,256,320 A * 2/1918 Holmes ..................... E03D 5/01 4/321
1,514,157 A * 11/1924 Harding .................. B60R 15/04 296/156
2,611,134 A * 9/1952 Jarrett ..................... E03D 11/12 4/300
2,817,091 A * 12/1957 Painter ...................... E03D 7/00 4/321
2,944,852 A * 7/1960 Snyder ...................... B60P 3/34 296/171
3,040,333 A * 6/1962 Merrill .................... B60R 15/04 4/315

(Continued)

FOREIGN PATENT DOCUMENTS

DE 102012003713 A1 * 8/2013 ............ B64D 11/02
EP 1464542 A2 * 10/2004 ............ B60R 15/04

(Continued)

*Primary Examiner* — Lori L Baker
(74) *Attorney, Agent, or Firm* — Dunlap Bennett & Ludwig PLLC

(57) ABSTRACT

A vehicle-integrated-biodegradable sanitation system includes a toilet disposed within a trunk compartment of a standard passenger vehicle, a waste tank fluidly connected to the toilet for receiving and storing waste material, and a flush mechanism for transferring waste from the toilet to the waste tank. The system includes a filter positioned to mitigate odors from the waste tank. The toilet may be configured to fold into a recessed well for compact storage when not in use. Additional components may include a sink for hand-washing, a water reservoir for supplying flush water, a refrigerator for food storage, and a privacy enclosure deployable around the toilet area. The waste tank may be removable for off-site disposal or may include a drain port for connection to disposal hoses. The system provides sanitation facilities in vehicles not traditionally equipped with such amenities, suitable for travelers, individuals with medical needs, and emergency situations.

10 Claims, 8 Drawing Sheets

(56) References Cited

U.S. PATENT DOCUMENTS

| | | | | | |
|---|---|---|---|---|---|
| 3,585,649 | A * | 6/1971 | Masami | E03D 5/00 | 4/300 |
| 3,594,825 | A * | 7/1971 | Reid | B61D 35/00 | 4/663 |
| 3,611,446 | A * | 10/1971 | Howard | E03D 5/00 | 4/315 |
| 3,708,806 | A * | 1/1973 | Kemper | B01D 35/26 | 4/321 |
| 3,871,399 | A * | 3/1975 | Watson | B60R 15/00 | 137/579 |
| 4,012,797 | A * | 3/1977 | Kristoffersen | E03D 11/04 | 4/300 |
| 4,202,061 | A * | 5/1980 | Waters | B64C 1/1453 | 4/300 |
| 4,398,308 | A * | 8/1983 | Berg | A47K 3/28 | 4/596 |
| 4,433,443 | A * | 2/1984 | DeGraw | E03D 5/016 | 4/321 |
| 4,504,983 | A * | 3/1985 | Goodyer | E04H 1/1216 | D25/16 |
| 4,519,103 | A * | 5/1985 | De Graw | E03D 5/016 | 4/321 |
| 4,776,631 | A * | 10/1988 | Sargent | B60R 15/04 | 4/300 |
| 4,785,483 | A * | 11/1988 | Wise | E03D 5/00 | 4/321 |
| 4,815,786 | A * | 3/1989 | McRay | B60P 3/34 | 296/26.05 |
| 4,974,899 | A * | 12/1990 | Sargent | B60R 15/04 | 296/156 |
| 5,031,249 | A * | 7/1991 | Sargent | B60R 15/04 | 4/321 |
| 5,206,962 | A * | 5/1993 | Thorwaldson | E03D 5/00 | 4/415 |
| 5,379,466 | A * | 1/1995 | Davies | A47K 11/00 | 4/449 |
| 5,408,704 | A * | 4/1995 | Bailey | E03F 1/006 | 4/321 |
| 5,551,097 | A * | 9/1996 | Short | E03D 13/00 | 4/144.1 |
| 5,604,938 | A * | 2/1997 | Tyler | E03F 1/006 | 4/321 |
| 5,862,540 | A * | 1/1999 | Chuan | B60R 15/00 | 4/449 |
| 6,079,770 | A * | 6/2000 | Bocian | B60R 15/04 | 296/24.45 |
| 6,158,061 | A * | 12/2000 | Cameron | E03D 5/01 | 4/300 |
| 6,178,566 | B1 * | 1/2001 | Yagi | E03D 7/00 | 4/321 |
| 6,189,161 | B1 * | 2/2001 | Rijn | F16K 15/148 | 4/321 |
| 6,212,700 | B1 * | 4/2001 | Giesler | E03D 5/012 | 4/438 |
| 6,223,361 | B1 * | 5/2001 | Rozenblatt | E03F 1/006 | 4/321 |
| 6,330,725 | B1 * | 12/2001 | Karlsson | B64D 11/02 | 4/321 |
| 6,516,836 | B2 * | 2/2003 | Fields | B60R 15/00 | 4/321 |
| 6,957,450 | B2 * | 10/2005 | Sigler | E03D 11/16 | 4/315 |
| 7,137,156 | B2 * | 11/2006 | Yang | E04H 1/1216 | 4/476 |
| 7,313,833 | B2 * | 1/2008 | Wee | B60R 15/04 | 4/476 |
| 7,725,961 | B2 * | 6/2010 | Martinez | E03D 5/01 | 4/321 |
| 7,758,103 | B1 * | 7/2010 | Steury | B60P 3/34 | 296/26.05 |
| 7,780,222 | B2 * | 8/2010 | Podgorney | B60R 15/04 | 296/173 |
| 7,802,323 | B2 * | 9/2010 | Al-Mutairi | A47K 11/04 | 4/476 |
| 8,678,472 | B2 * | 3/2014 | Pierce | B60P 3/341 | 296/159 |
| 9,126,548 | B1 * | 9/2015 | Alneaimi | E03D 9/08 | |
| 9,925,932 | B2 * | 3/2018 | Julian | B60R 15/04 | |
| 10,183,608 | B2 * | 1/2019 | Knight | B60P 3/34 | |
| 10,654,426 | B1 * | 5/2020 | Keller | E03D 3/10 | |
| 11,357,361 | B1 * | 6/2022 | Wright | E04H 1/1216 | |
| 2003/0033664 | A1 * | 2/2003 | Grech | B60R 15/00 | 4/321 |
| 2003/0135919 | A1 * | 7/2003 | Lutz | A47K 11/02 | 4/321 |
| 2003/0154543 | A1 * | 8/2003 | Sigler | E03D 11/16 | 4/300 |
| 2004/0003461 | A1 * | 1/2004 | Leclercq | B63B 29/14 | 4/664 |
| 2005/0010999 | A1 * | 1/2005 | Sigler | E03D 11/16 | 4/321 |
| 2005/0055759 | A1 * | 3/2005 | Cameron | B60R 15/04 | 4/321 |
| 2005/0283893 | A1 * | 12/2005 | Delaney | E03D 7/00 | 4/321 |
| 2007/0234472 | A1 * | 10/2007 | Podgorney | B60R 15/04 | 296/2 |
| 2007/0256221 | A1 * | 11/2007 | Schagen | B60R 15/04 | 4/321 |
| 2010/0115690 | A1 * | 5/2010 | Wunderlich | B60R 15/04 | 4/321 |
| 2011/0061156 | A1 * | 3/2011 | McKiernan | E03D 11/11 | 4/321 |
| 2011/0113545 | A1 * | 5/2011 | Driessen | B60R 9/06 | 4/476 |
| 2012/0060271 | A1 * | 3/2012 | Dannenberg | B64D 11/02 | 4/321 |
| 2012/0151666 | A1 * | 6/2012 | Dannenberg | B64D 11/02 | 4/321 |
| 2012/0167297 | A1 * | 7/2012 | Poust | E04H 1/1205 | 4/321 |
| 2013/0081200 | A1 * | 4/2013 | Jochim | B60R 15/04 | 4/315 |
| 2014/0020167 | A1 * | 1/2014 | Rieger | E03D 5/003 | 4/321 |
| 2014/0109310 | A1 | 4/2014 | Meressa | | |
| 2014/0215702 | A1 * | 8/2014 | Ito | E03D 7/00 | 4/321 |
| 2014/0359934 | A1 * | 12/2014 | Schliwa | B64D 11/02 | 4/300 |
| 2015/0059075 | A1 * | 3/2015 | Oxenfarth | B60R 15/04 | 4/321 |
| 2015/0225936 | A1 * | 8/2015 | Mehta | B60R 15/04 | 4/321 |
| 2017/0361786 | A1 * | 12/2017 | Julian | E03D 7/00 | |
| 2018/0023275 | A1 * | 1/2018 | Getmann | B61D 35/005 | 4/321 |
| 2020/0015636 | A1 * | 1/2020 | Warren | E03D 5/016 | |
| 2020/0256045 | A1 * | 8/2020 | Trout | E03D 5/006 | |
| 2022/0055548 | A1 * | 2/2022 | Randhawa | B60R 15/04 | |
| 2023/0349138 | A1 * | 11/2023 | Townes | E03D 3/10 | |
| 2025/0228416 | A1 * | 7/2025 | Wharton | C05F 3/06 | |

FOREIGN PATENT DOCUMENTS

| | | | | |
|---|---|---|---|---|
| EP | 1657369 | A2 * | 5/2006 | E03D 5/01 |
| EP | 1958826 | A1 * | 8/2008 | B60R 15/04 |
| EP | 2842811 | A1 * | 3/2015 | B60R 15/04 |
| EP | 3406491 | A1 * | 11/2018 | B60R 15/00 |
| JP | 2001342664 | A * | 12/2001 | A47K 3/325 |
| WO | WO-0242229 | A1 * | 5/2002 | C02F 3/34 |
| WO | WO-2004065704 | A1 * | 8/2004 | E03D 9/05 |
| WO | WO-2009136782 | A1 * | 11/2009 | A47K 3/325 |
| WO | WO-2016089947 | A1 * | 6/2016 | A47J 31/4457 |

* cited by examiner

VEHICLE-INTEGRATED-BIODEGRADABLE TOILET SYSTEM

CROSS-REFERENCE TO RELATED APPLICATION

This application claims the benefit of priority under 35 U.S.C. § 119(e) to U.S. Provisional Patent Application No. 63/799,031, filed May 2, 2025, the entire contents of which are incorporated herein by reference.

FIELD OF THE INVENTION

The present invention relates generally to vehicle sanitation systems, and more particularly to an integrated toilet system configured for installation within standard passenger vehicles, including cars, sport utility vehicles (SUVs), and light-duty trucks.

BACKGROUND OF THE INVENTION

Mobile sanitation solutions have traditionally been limited to larger recreational vehicles (RVs), which are specifically designed and manufactured to accommodate restroom facilities. These vehicles, due to their size and structural layout, can integrate waste storage tanks, water supply systems, and enclosed toilet spaces. Waste may be filtered or converted into a form suitable for use as biodegradable fuel supplement. The convenience of having onboard sanitation has long been associated with camping trips or extended travel in larger vehicles.

Conversely, conventional passenger vehicles—such as sedans, sport utility vehicles (SUVs), and light-duty trucks—are not equipped with such features. Current industry practices do not include built-in toilet systems within these classes of vehicles. This absence of onboard restroom facilities in everyday passenger vehicles poses significant inconveniences for many travelers.

Whether commuting long distances, encountering unforeseen traffic delays, or traveling with children, the absence of an accessible toilet can create uncomfortable or even urgent situations. Certain health conditions, medical emergencies, or specific physical needs can necessitate frequent restroom access that standard vehicle configurations fail to support. Individuals with medical conditions such as irritable bowel syndrome, Crohn's disease, or urinary incontinence face particular challenges when traveling in conventional vehicles.

While portable toilets or travel urinals exist as aftermarket accessories, they often lack privacy, pose sanitation challenges, and do not integrate seamlessly into a vehicle's structure, leading to limited adoption and effectiveness. These portable solutions typically require manual setup, lack proper waste containment, and fail to provide the dignity and comfort associated with proper restroom facilities.

No current manufacturers offer factory-installed toilet systems in standard-sized vehicles. This is in stark contrast to the RV industry, where such systems are considered essential and commonplace. For everyday drivers, the only current options require either improvisation or planning routes around restroom access, which is not always feasible or safe, particularly in remote areas or during emergencies.

Furthermore, with the increasing time spent in vehicles due to urban congestion and long-distance travel, the demand for more versatile, self-contained travel solutions is growing but remains unmet by existing technologies and vehicle offerings. The rise of road-based employment, including delivery drivers, ride-share operators, and mobile service professionals, has further highlighted the need for accessible sanitation solutions in standard vehicles.

What is needed, therefore, is an integrated, vehicle-installed toilet system specifically designed for use in cars, trucks, and SUVs that can be factory-equipped or aftermarket-installed with appropriate plumbing infrastructure and compactly installed within the vehicle's cargo or rear compartment. Such a solution would provide access to restroom facilities in a safe, private, and sanitary manner for individuals and families during travel, emergencies, or extended periods on the road.

SUMMARY OF THE INVENTION

The present invention addresses the aforementioned needs by providing a vehicle-integrated-biodegradable toilet system configured for installation in standard passenger vehicles. The system provides a complete sanitation solution that can be incorporated into the trunk or cargo area of a vehicle without significantly compromising cargo capacity or vehicle functionality.

In one aspect, the invention provides a sanitation system for installation in a motor vehicle. The system comprises a vehicle having a trunk compartment or cargo area, a toilet installed within the trunk compartment, and a waste tank fluidly connected to the toilet and configured to receive waste material from the toilet. A flush mechanism is operably connected to the toilet to initiate transfer of waste from the toilet bowl to the waste tank. The toilet may be configured to fold or retract into a recessed compartment within the trunk floor for compact storage when not in use.

In another aspect, the system includes a water supply subsystem configured to provide water to the flush mechanism and, optionally, to a sink installed adjacent to the toilet for hand-washing purposes. The water supply may be provided by a dedicated water reservoir or may be integrated with the vehicle's existing fluid systems.

In a further aspect, the system includes an odor control subsystem comprising one or more filters positioned to mitigate odors emitted from the waste tank. The filtration system may include activated carbon filters, chemical neutralizers, or ventilation systems that direct odorous air through filtration media before venting to the exterior of the vehicle.

In yet another aspect, the waste tank is configured to be removable from the vehicle for off-site disposal at designated dump stations, similar to systems used in recreational vehicles. Alternatively, the waste tank may be configured to accept disposable waste bags that can be removed and disposed of without requiring removal of the entire tank assembly.

In an additional aspect, the system includes a privacy enclosure comprising one or more panels, curtains, or partitions that can be deployed to shield the toilet area from view when in use. The privacy enclosure may be stored compactly when not in use and may include support structures that interface with the vehicle's interior surfaces.

The system may further include auxiliary components such as a sink with an associated water supply and drainage system, a refrigerator for food and beverage storage, lighting fixtures, ventilation fans, and storage compartments for toiletries and sanitation supplies.

The toilet system can be installed as a factory-equipped option during vehicle manufacturing, wherein the vehicle is preconfigured with structural reinforcements, plumbing lines, electrical connections, and mounting provisions.

Alternatively, the system can be provided as an aftermarket kit for installation in existing vehicles.

One advantage of the present invention is that it provides restroom facilities in standard passenger vehicles that are not traditionally equipped with such amenities.

Another advantage is that the system can be configured to fold or retract when not in use, minimizing impact on cargo capacity.

A further advantage is that the system provides a sanitary and private solution for individuals with medical conditions requiring frequent restroom access.

Yet another advantage is that the system is suitable for emergency situations, extended travel, remote work locations, and other scenarios where traditional restroom facilities are unavailable.

Still another advantage is that the modular design of the system allows for customization based on vehicle size, user needs, and intended applications.

These and other features, aspects, and advantages of the present invention will become better understood with reference to the following drawings, description, and claims.

BRIEF DESCRIPTION OF THE DRAWINGS

The accompanying drawings, which are incorporated in and constitute a part of this specification, illustrate embodiments of the invention and, together with the description, serve to explain the principles of the invention.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, embodiments of the present invention provide a toilet system integrated into a standard passenger vehicle, offering sanitation facilities within the vehicle's trunk or cargo area. The system is designed to be compact, functional, and compatible with various vehicle types including sedans, SUVs, and light-duty trucks.

General System Configuration

Figure 1:
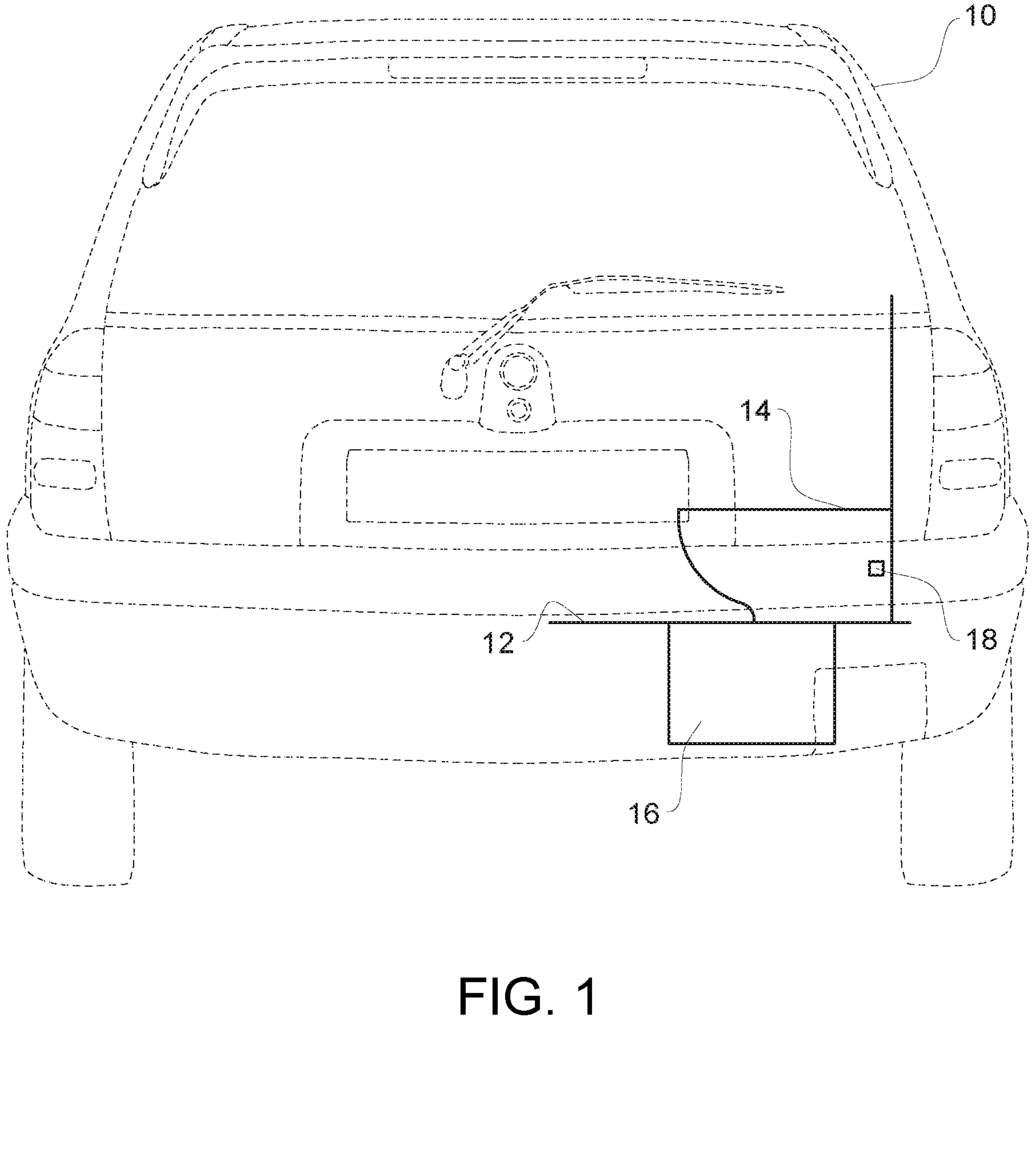
FIG. 1 is a rear perspective view of a vehicle with an integrated biodegradable sanitation system installed in the trunk compartment, showing the system in a deployed configuration including the toilet, privacy enclosure, curtain, flexible panels, and ventilation fan, in accordance with an embodiment of the present invention.
Figure 1A:
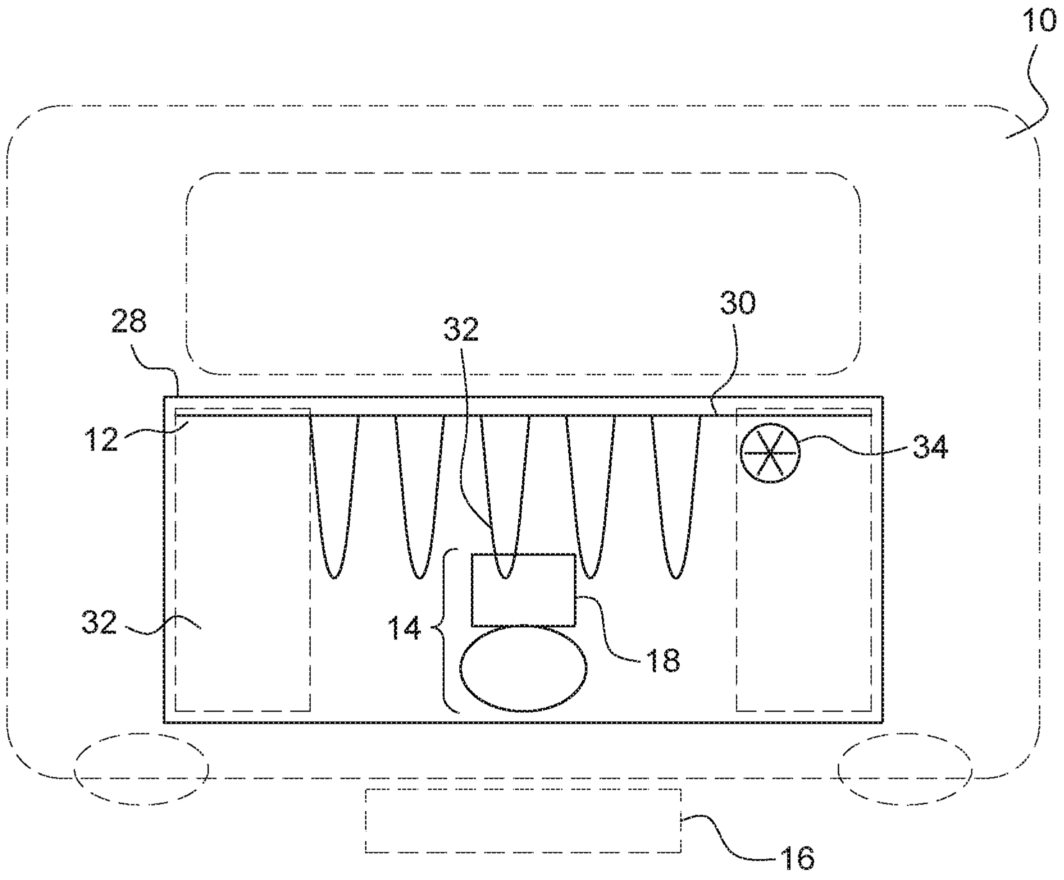
FIG. 1A is an enlarged detail view of the toilet and its folding mechanism of the integrated toilet system, shown in relation to a recessed well formed in the floor of the trunk compartment, in accordance with an embodiment of the present invention.
Figure 2:
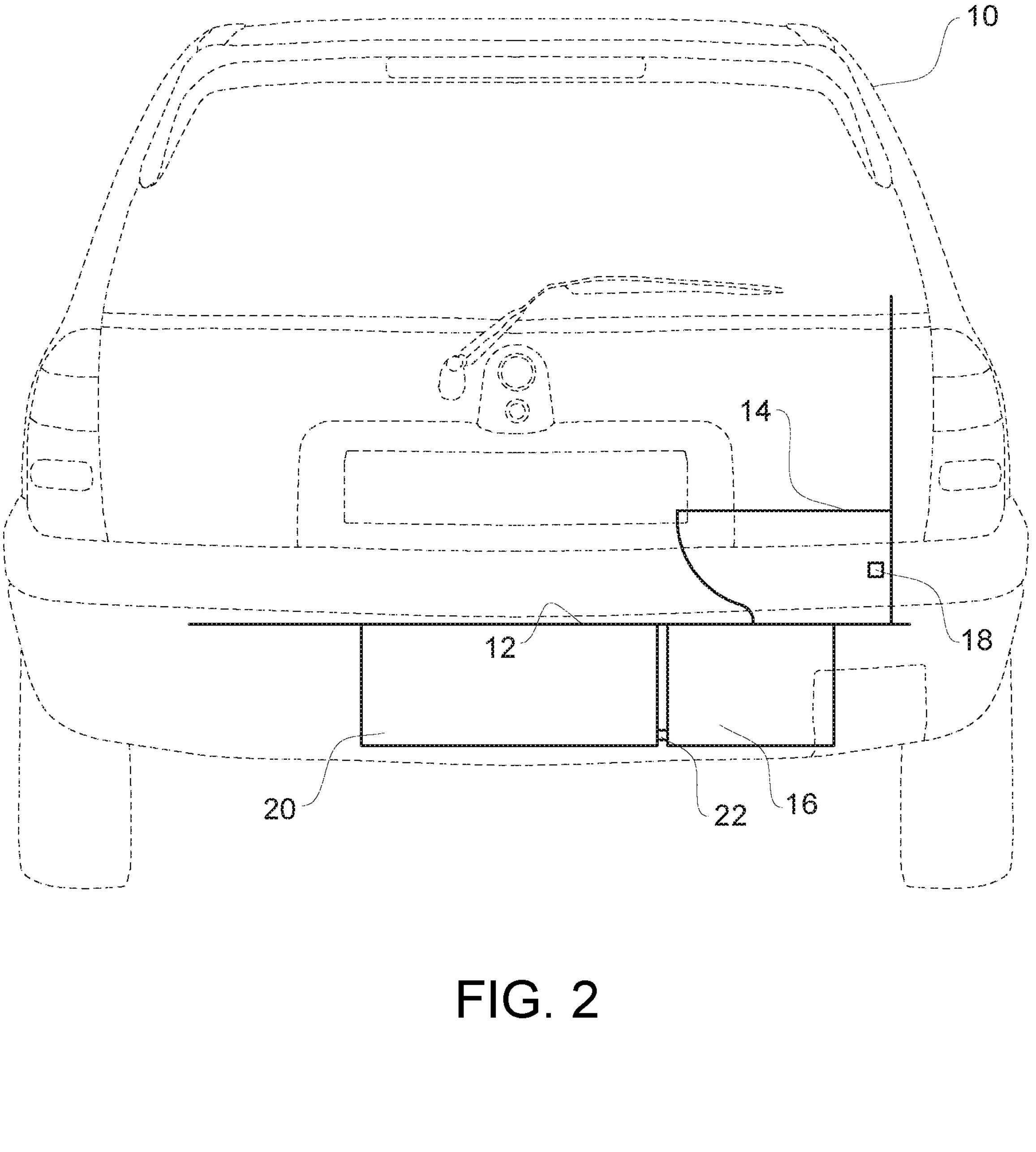
FIG. 2 is a cross-sectional side view of a vehicle showing the internal arrangement of the sanitation system components including the toilet, flush mechanism, water supply line, water reservoir, filter, ventilation fan, waste tank, drain port, disposal hose, waste bag, and recessed well, in accordance with an embodiment of the present invention.
Figure 2A:
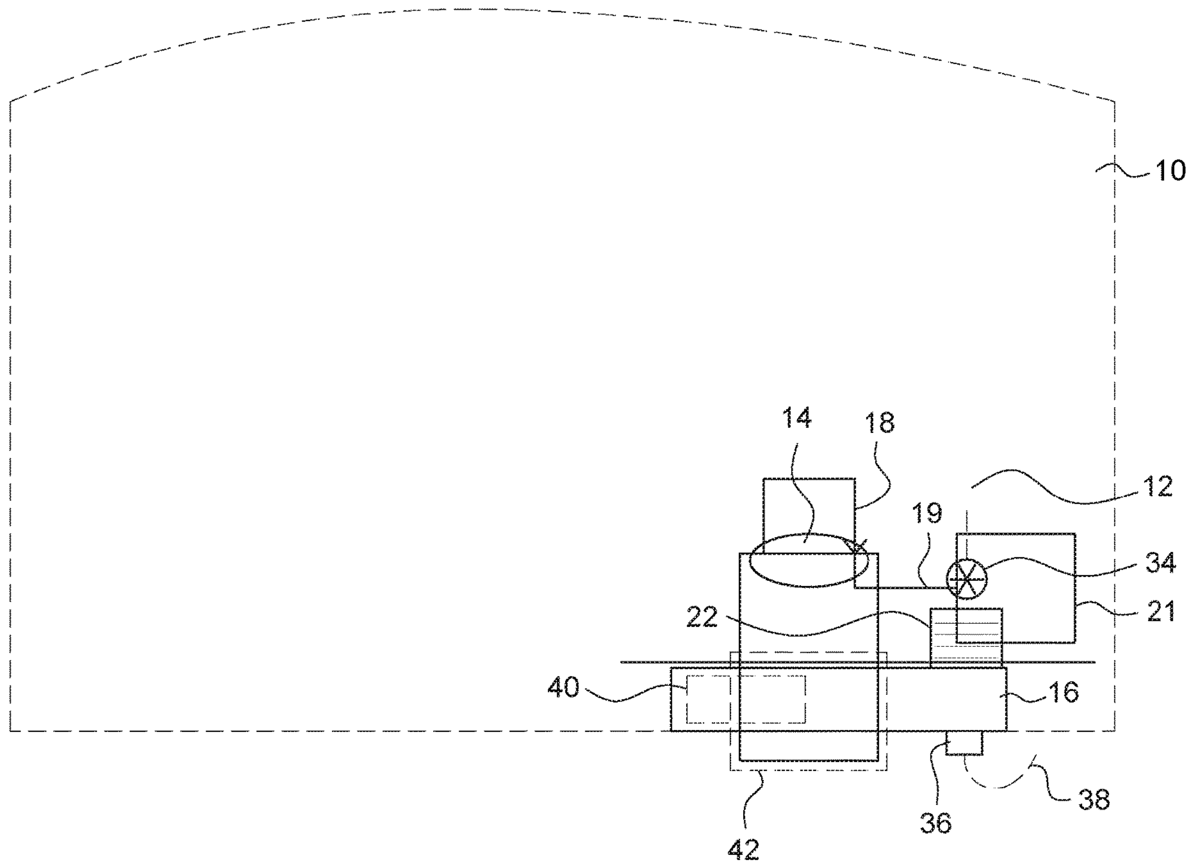
FIG. 2A is an enlarged detail view of the waste tank, the filter, and the associated odor control and ventilation components of the integrated toilet system, in accordance with an embodiment of the present invention.
Figure 3:
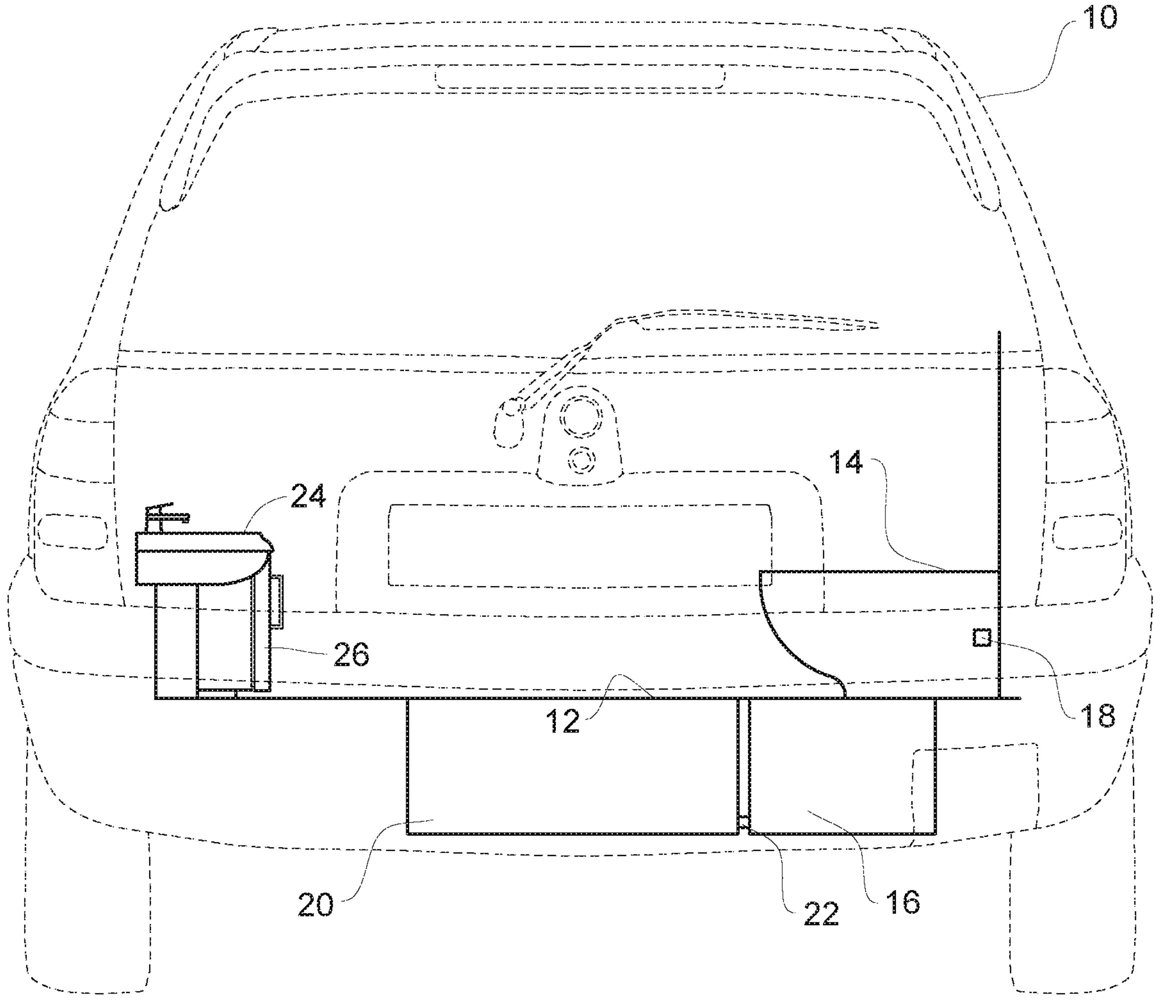
FIG. 3 is an enlarged detail view of the folding mechanism of the toilet assembly, showing the toilet in a deployed configuration in solid lines and a stored configuration in phantom lines, and depicting the recessed well, recessed compartment, folding mechanism, folding structure, hinges, pivot, and sliding track, in accordance with an embodiment of the present invention.

Referring now to the accompanying drawings, FIGS. 1-3 illustrate an embodiment of the vehicle-integrated-biodegradable toilet system. FIGS. 1A, 2A, 3A, 4, 5, and 6 illustrate additional enlarged detail and schematic views of the same embodiment and its subsystems. The system is generally configured for installation in a standard passenger vehicle 10, which may be a car, SUV, light-duty truck, or similar vehicle. The vehicle 10 includes a trunk compartment 12 or cargo area that serves as the primary installation location for the toilet system components.

The trunk compartment 12 is the rearmost cargo-carrying portion of the vehicle 10, accessible through a rear hatch, tailgate, or trunk lid. In SUVs and station wagons, the trunk compartment 12 may comprise the rear cargo area behind the rearmost row of seats. In pickup trucks, the system may be installed in an enclosed truck bed or camper shell. The trunk compartment 12 provides sufficient space to accommodate the toilet system while maintaining some cargo-carrying capacity.

Toilet Assembly

Centrally positioned within the trunk compartment 12 is a toilet 14, which serves as the primary sanitation fixture. The toilet 14 comprises a toilet bowl, a seat assembly, and a mounting structure that secures the toilet 14 to the floor or structure of the trunk compartment 12. The toilet 14 may be a standard gravity-flush toilet adapted for vehicular use, a low-flow toilet designed to minimize water consumption, or a specialized marine or RV-type toilet configured for mobile applications.

In a preferred embodiment, the toilet 14 is configured to fold, pivot, or retract into a recessed compartment or well formed in the floor of the trunk compartment 12. This folding mechanism allows the toilet 14 to be stowed in a compact configuration when not in use, thereby preserving cargo space. The recessed well may be formed by modifying the vehicle floor during manufacturing or by installing a raised platform structure that defines a storage cavity.

The folding mechanism may comprise hinges, pivot points, or sliding tracks that guide the toilet 14 between a deployed position (in which the toilet is upright and ready for use) and a stored position (in which the toilet is folded down or retracted into the well). Locking mechanisms may be provided to secure the toilet 14 in either position. An enlarged detail view of the toilet 14, together with its folding mechanism and the recessed well formed in the floor of the trunk compartment 12, is shown in FIG. 1A. The folding mechanism may be manually operated or may include powered actuators that deploy and retract the toilet 14 at the press of a button.

The toilet 14 may include a seat lid that closes to contain odors and provide a flat surface when the toilet is not in use. The seat and lid may be formed from durable, easy-to-clean materials such as molded plastic or composite materials.

Waste Management System

The toilet 14 is fluidly connected to a waste tank 16, which is configured to receive and store waste material from the toilet 14. The waste tank 16 is positioned adjacent to, below, or behind the toilet 14 within the trunk compartment 12. The waste tank 16 may be fabricated from rigid plastic, fiberglass, or stainless steel, and is designed to be leak-proof and impact-resistant.

The waste tank 16 includes an inlet port that connects to an outlet of the toilet 14, typically through a flexible or rigid drain pipe. The connection may include sealing gaskets or flanges to prevent leakage. The waste tank 16 may have a capacity ranging from approximately 5 gallons to 25 gallons, depending on the vehicle size and intended usage frequency.

In one embodiment, the waste tank 16 is removable from vehicle 10 to facilitate emptying at designated dump stations, similar to the systems commonly used in recreational vehicles. The waste tank 16 may include handles or grips to facilitate carrying and may be mounted on slides or rails that allow it to be easily withdrawn from its mounting location.

In an alternative embodiment, the waste tank 16 is permanently installed but includes an external access port through which the contents can be drained. The access port may include a threaded cap, a quick-disconnect fitting, or a valve that connects to a standard RV dump hose.

In yet another embodiment, the waste tank 16 is configured to accept disposable waste bags or liners. In this configuration, waste material is collected in the disposable bag, which can be removed and disposed of without requiring removal of the entire tank assembly. The disposable bags may be secured to the interior of the toilet bowl or to a holder within the waste tank 16.

In an innovative aspect, waste material collected in the waste tank 16 may be processed or treated before disposal. For example, the system may include chemical treatment agents that are automatically or manually added to the waste tank 16 to break down solid waste, neutralize odors, and sanitize the contents. In some embodiments, processed waste may be filtered or converted into a form suitable for use as biodegradable fuel supplement, although this would require additional processing systems and regulatory compliance.

Flush Mechanism

A flush mechanism is provided to transfer waste from the toilet bowl into the waste tank 16. The flush mechanism is actuated by a flush handle 18, flush button, or foot pedal that the user engages to initiate the flushing action. The flush handle 18 may be mounted on the toilet 14 itself, on an adjacent wall surface, or on a control panel.

The flush mechanism may operate by gravity, wherein water is released from a reservoir and flows through the toilet bowl to carry waste into the waste tank 16. Alternatively, the flush mechanism may employ a pump that actively moves water through the toilet bowl. Pump-based systems may be electrically powered, drawing power from the vehicle's electrical system, or may be manually operated through a hand pump or foot pump.

Water for the flush mechanism is supplied from a water reservoir or water tank (not separately numbered but integrated into the overall system). The water reservoir may be a dedicated tank holding fresh water or may be integrated with other water uses such as the sink 24. The water reservoir is positioned to provide gravity-fed water flow or is connected to a pump that delivers water on demand. The capacity of the water reservoir may range from approximately 5 gallons to 20 gallons.

In some embodiments, the water reservoir may be configured to be refilled from an external water source, such as a garden hose or water spigot, through a fill port accessible from the exterior of vehicle 10. In other embodiments, the water reservoir may be removable for refilling.

Odor Control and Filtration

To control odors emanating from the waste tank 16 and toilet 14, the system includes one or more filters 22. Filter 22 may comprise an activated carbon filter, a chemical odor neutralizer, or a combination of filtration media designed to capture and neutralize malodorous compounds.

Filter 22 may be positioned in the ventilation path of the waste tank 16, such that air displaced from the waste tank 16 (when waste enters or when pressure changes occur) passes through filter 22 before being vented to the atmosphere or back into the vehicle cabin. Filter 22 may be housed in a filter cartridge or canister that can be periodically replaced when its odor-absorption capacity is exhausted.

In some embodiments, the system includes a ventilation fan or blower that actively draws air through filter 22 and vents it to the exterior of vehicle 10. The ventilation system may be powered by the vehicle's electrical system and may operate continuously, periodically, or on-demand when the toilet 14 is in use.

Waste tank 16 may also include a pressure relief valve or vent that prevents excessive pressure buildup while directing gases through filter 22. An enlarged detail view of the waste tank 16 and the filter 22, together with the associated ventilation path, is shown in FIG. 2A. The odor control and filtration subsystem is further illustrated schematically in FIG. 5, in which air displaced from the waste tank 16 is drawn through the filter 22, which may comprise an activated carbon filter, and is vented to the exterior of the vehicle 10, optionally by operation of a ventilation fan.

Auxiliary Components

The system may include additional components to enhance functionality, convenience, and hygiene. In the illustrated embodiment, these auxiliary components include a sink 24 and a refrigerator 26, though other components may also be incorporated.

The sink 24 is installed adjacent to or near the toilet 14, allowing users to wash their hands after using the toilet. The sink 24 includes a basin, a faucet, and a drainage system. Water is supplied to the faucet from the same water reservoir that supplies the flush mechanism, or from a separate water reservoir. The faucet may be manually operated (e.g., a lever or knob) or may include an electronic sensor that activates water flow when hands are detected.

Drainage from the sink 24 may be directed into the waste tank 16, into a separate greywater tank, or into a direct-drain system that empties to the exterior of the vehicle. In configurations where sink drainage enters the waste tank 16, a separate inlet port or a shared inlet with the toilet drain may be provided.

Refrigerator 26 is a compact cooling unit intended to preserve food and beverages during travel. The refrigerator 26 may be a thermoelectric cooler, a compressor-based refrigerator, or a portable cooler adapted for vehicle installation. The refrigerator 26 is electrically powered, drawing power from the vehicle's 12-volt electrical system or from an auxiliary battery. Refrigerator 26 is positioned within the trunk compartment 12 in a location that does not interfere with access to toilet 14, such as along a side wall or at the rear of the compartment.

Other auxiliary components that may be included in the system include:

- A storage cabinet or compartments for toilet paper, sanitation supplies, towels, and personal hygiene items.
- Lighting fixtures, such as LED lights, to illuminate the toilet area for nighttime use.
- A privacy curtain, screen, or partition system that can be deployed to enclose the toilet area when in use.
- Coat hooks, towel bars, or accessory holders.
- A mirror for grooming and hygiene purposes.
- A ventilation fan separate from or in addition to the odor control fan.
- A heating element or insulated enclosure for use in cold weather.

Privacy Enclosure

To provide privacy when the toilet 14 is in use, the system may include a privacy enclosure comprising one or more panels, curtains, or partitions. In one embodiment, the privacy enclosure comprises flexible curtains that are suspended from support rods or tracks mounted to the interior surfaces of the trunk compartment 12 or to the vehicle body. The curtains can be drawn closed to surround the toilet area and can be retracted or tied back when not in use.

In another embodiment, the privacy enclosure comprises rigid or semi-rigid panels that fold out from stored positions to form walls around the toilet area. The panels may be hinged, sliding, or telescoping, and may include locking mechanisms to hold them in the deployed position.

Figure 3A:
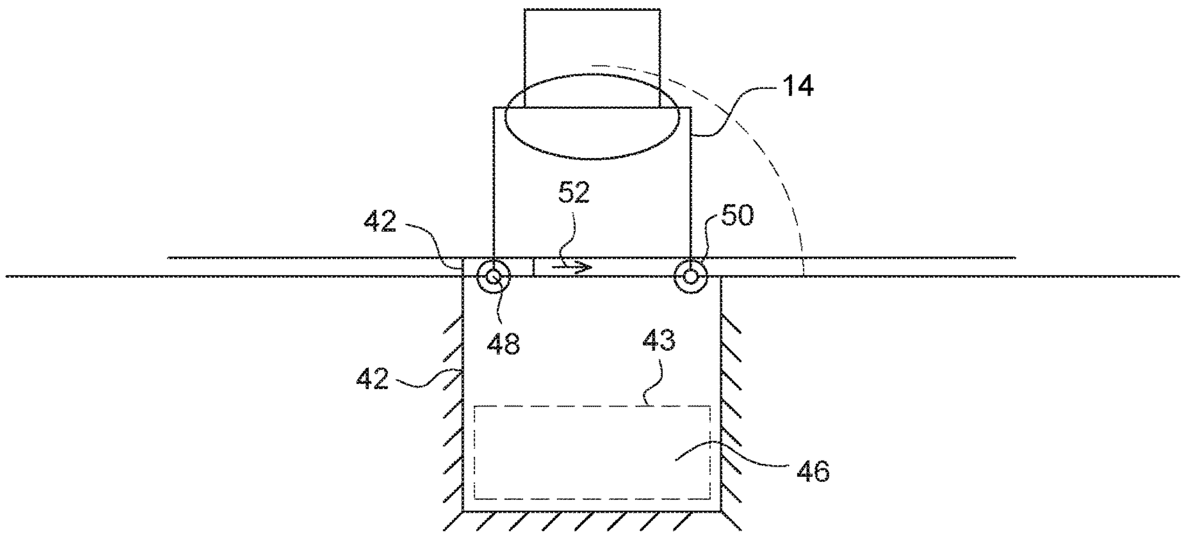
FIG. 3A is a detail view of the privacy enclosure of the integrated toilet system shown in a deployed configuration about the toilet, in accordance with an embodiment of the present invention.
Figure 4:
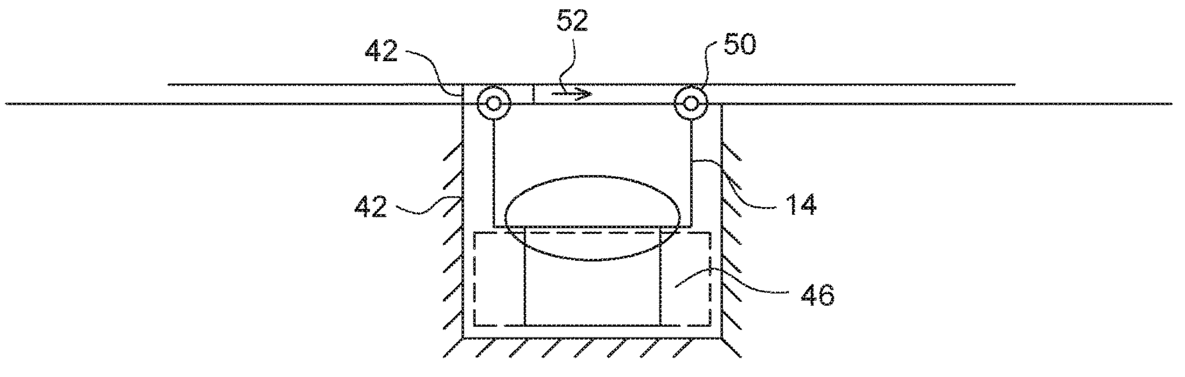
FIG. 4 is a detail view of the privacy enclosure of the integrated toilet system shown in a stored or folded configuration, in accordance with an embodiment of the present invention.
Figure 5:
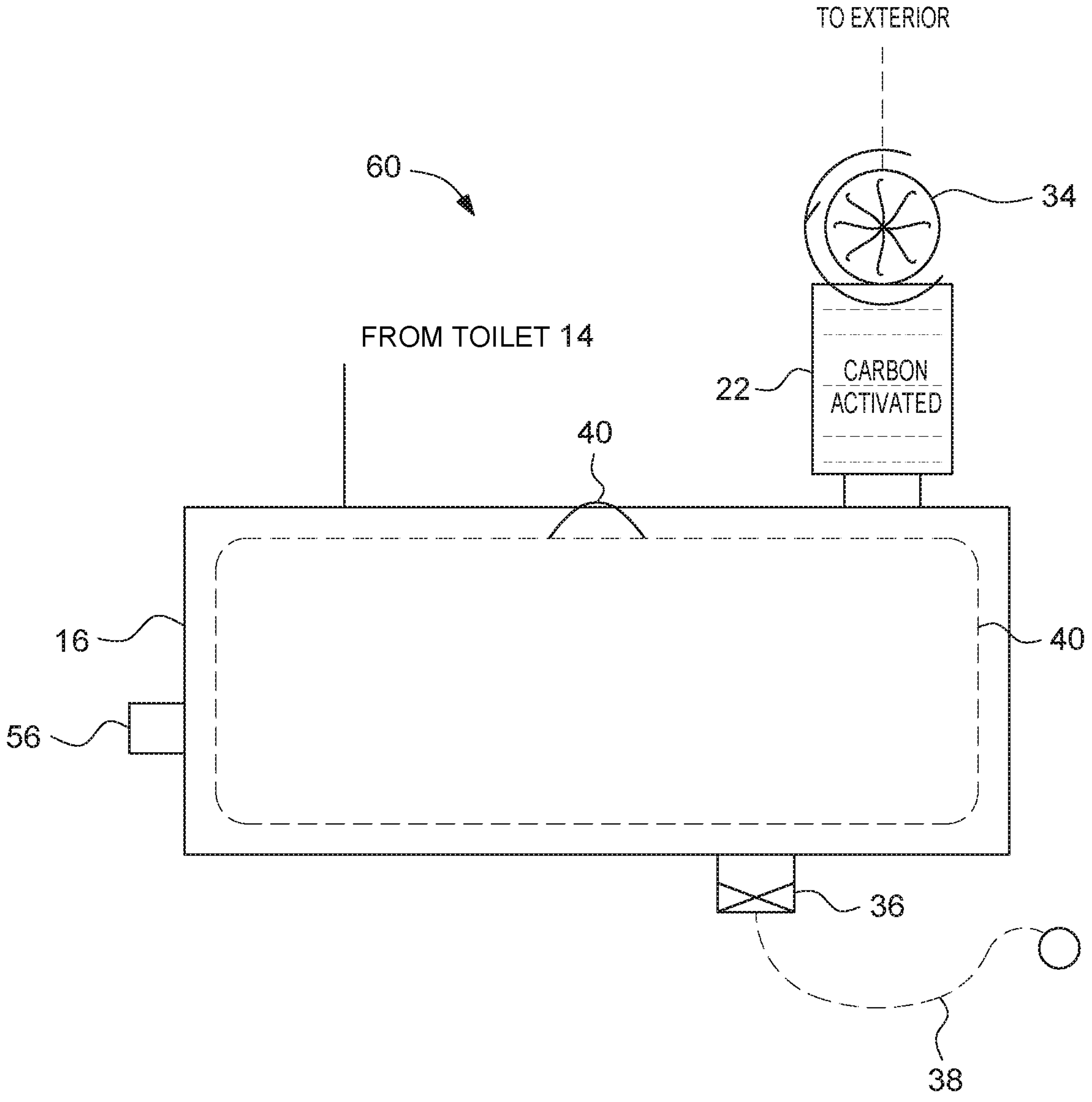
FIG. 5 is a schematic view of the odor control and filtration subsystem of the integrated toilet system, illustrating the flow of air from the waste tank through an activated carbon filter and a ventilation fan to the exterior of the vehicle, in accordance with an embodiment of the present invention.
Figure 6:
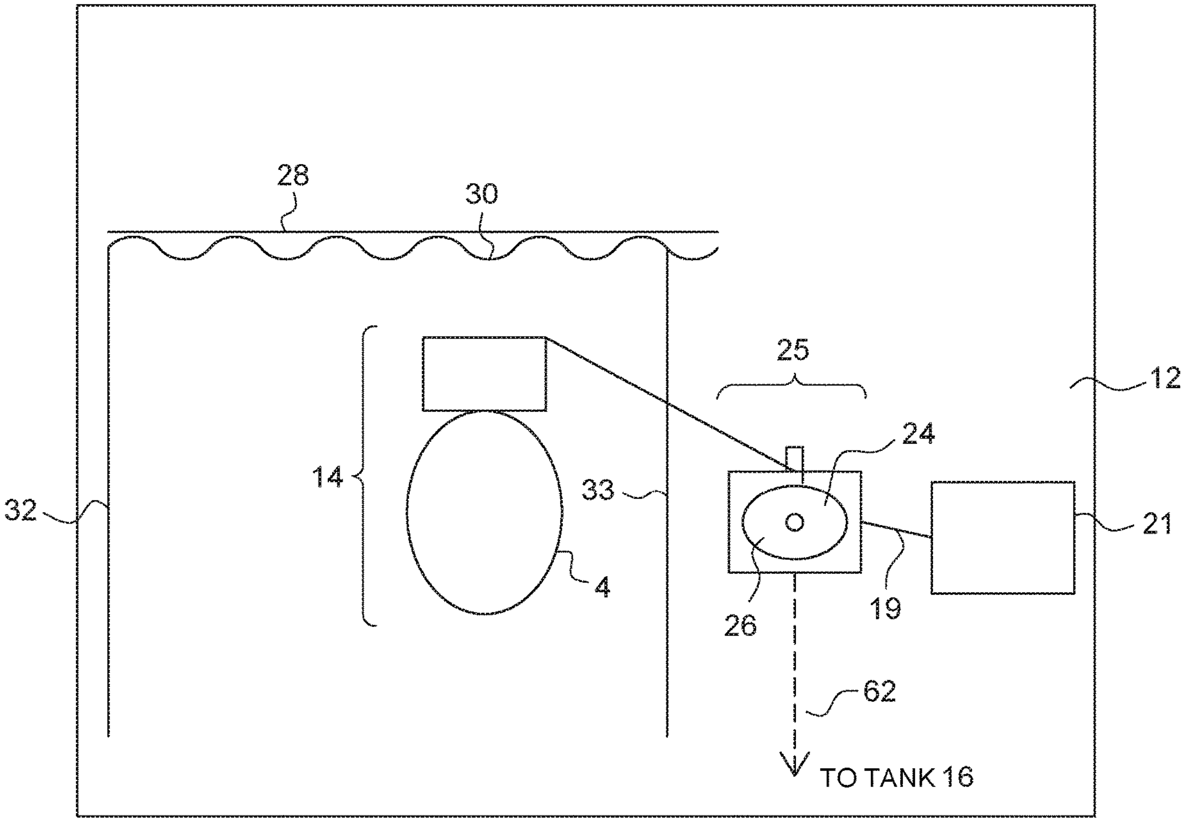
FIG. 6 is a schematic view of the flush mechanism of the integrated toilet system, illustrating the flow of waste material from the toilet to the waste tank, in accordance with an embodiment of the present invention.

The privacy enclosure may extend from the floor of the trunk compartment 12 to the ceiling or roof of the vehicle interior or may extend to a sufficient height to provide visual privacy while seated on the toilet 14. FIG. 3A illustrates the privacy enclosure in a deployed configuration about the toilet 14, and FIG. 4 illustrates the privacy enclosure in a stored or folded configuration.

Electrical and Plumbing Integration

The vehicle 10 may include modifications or enhancements to its electrical and plumbing systems to support the toilet system. During manufacturing, the vehicle 10 may be preconfigured with wiring harnesses that provide power to the toilet system components (such as the flush pump, ventilation fans, lighting, and refrigerator). Junction boxes or connectors may be provided at strategic locations to facilitate installation of the toilet system components.

Plumbing lines may be pre-installed or may be routed during system installation. These plumbing lines include water supply lines that convey water from the water reservoir to the flush mechanism and sink faucet, and drainage lines that convey waste from the toilet bowl and sink drain to the waste tank 16 or greywater tank.

In aftermarket installations, the installer may tap into the vehicle's existing electrical system (e.g., connecting to the vehicle battery or fuse box) and may route plumbing lines through available passages or along interior surfaces, securing them with clips or brackets.

Structural Considerations

Installation of the toilet system may require structural modifications to the trunk compartment 12. For example, the floor of the trunk compartment 12 may be reinforced to support the weight of the toilet 14, waste tank 16, and associated components, especially when the waste tank is full. Reinforcement may include additional cross-members, bracing, or a strengthened floor panel.

Mounting brackets, bolts, or anchors are provided to secure the toilet 14, waste tank 16, sink 24, and other components to the vehicle structure, ensuring that the components remain in place during vehicle operation, including acceleration, braking, and cornering.

In some embodiments, the vehicle manufacturer may offer the toilet system as a factory-installed option, wherein the vehicle is specifically designed to accommodate the system. This may include dedicated mounting points, integrated plumbing and electrical systems, and structural provisions that minimize the need for aftermarket modifications.

Fuel System Separation

The fuel tank 20 of the vehicle 10 is positioned at a location that is safely separated from the sanitary components of the toilet system to prevent any risk of contamination or safety hazards. The fuel tank 20 is typically located beneath the vehicle floor, forward of the trunk compartment 12, or in another location standard to vehicle design. The routing of plumbing and waste lines is planned to avoid any proximity to the fuel tank 20 or fuel lines.

While the provisional application mentioned the possibility of filtering waste material back into the fuel system as biodegradable fuel, such a configuration would require extensive additional processing systems, regulatory compliance, and safety measures. In most practical embodiments, the waste management system operates independently from the vehicle's fuel system, with no fluid connections between the two.

Installation Method

For aftermarket installation, the toilet system may be provided as a kit comprising the toilet 14, waste tank 16, water reservoir, flush mechanism, filter 22, sink 24 (if included), refrigerator 26 (if included), plumbing lines, electrical connections, mounting hardware, and installation instructions.

Installation involves:

1. Preparing the trunk compartment 12 by removing any interior trim panels, cargo covers, or other components that may interfere with installation.
2. If a recessed well is desired for the folding toilet, cutting an opening in the floor of the trunk compartment 12 and installing a well structure or platform.
3. Positioning and securing the waste tank 16 using mounting brackets or straps, ensuring that it is level and stable.
4. Mounting the toilet 14 in the desired location, either in a fixed position or with a folding mechanism and securing it with bolts or anchors to the floor or platform.
5. Connecting the toilet outlet to the waste tank inlet using appropriate plumbing fittings and seals.
6. Installing the water reservoir in a convenient location (e.g., under a side panel or in a corner of the trunk) and connecting water supply lines to the flush mechanism and sink faucet (if applicable).
7. Installing the flush mechanism and connecting it to the water supply and control handle 18.
8. Installing filter 22 in the ventilation path of the waste tank 16 and, if applicable, installing a ventilation fan and ducting to vent odorous air to the exterior of the vehicle.

9. If a sink 24 is included, mounting it adjacent to the toilet and connecting its water supply and drainage.
10. If a refrigerator 26 is included, positioning it in the trunk compartment 12 and connecting it to the vehicle's electrical system.
11. Running electrical wiring from the vehicle's electrical system to the components requiring power, using appropriate fuses, switches, and connectors.
12. Installing any privacy enclosures, curtains, partitions, lighting, or other accessories.
13. Testing all components to ensure proper operation, checking for leaks in the plumbing system, and verifying that electrical components function correctly.

Operation

In use, the vehicle operator or passenger accesses the trunk compartment 12 by opening the rear hatch, tailgate, or trunk lid of the vehicle 10. If the toilet 14 is in a folded or stored configuration, the user deploys toilet 14 by lifting it from the recessed well and locking it into the upright position. If a privacy enclosure is provided, the user deploys the curtains or partitions to enclose the toilet area.

The user then sits on the toilet 14 and uses it in the normal manner. After use, the user actuates the flush handle 18 (or button or pedal), which initiates the flush mechanism. Water from the water reservoir flows into the toilet bowl, carrying waste material down into the waste tank 16. The flush mechanism may operate for a predetermined duration or until the user releases the flush handle 18. The flush mechanism and the resulting flow of waste material from the toilet 14 to the waste tank 16 are illustrated schematically in FIG. 6.

After flushing, the user may wash their hands at the sink 24 if provided, using the faucet to dispense water into the basin. Wastewater from the sink drains into the waste tank 16 or a separate greywater tank.

If the privacy enclosure was deployed, the user retracts or opens it. If the toilet 14 is of the folding type, the user may fold it back into the stored position to restore cargo space.

Maintenance

Routine maintenance of the toilet system includes:

Periodically emptying the waste tank 16, either by removing the tank and transporting it to a dump station or by connecting a dump hose to the tank's drain port and emptying it at a suitable location.

Refilling the water reservoir when it becomes depleted, ensuring that an adequate water supply is available for flushing and hand-washing.

Replacing the filter 22 when its odor-absorption capacity is exhausted, typically indicated by increased odor or after a certain period of use.

Cleaning the toilet bowl, seat, sink basin, and other exposed surfaces with appropriate cleaning agents to maintain hygiene.

Inspecting plumbing connections for leaks and tightening or replacing seals as needed.

Checking electrical connections and ensuring that powered components (fans, lights, refrigerator) operate correctly.

Adding chemical treatment agents to the waste tank 16 if used to aid in waste breakdown and odor control.

Alternative Embodiments

While the preferred embodiment describes the toilet system as installed in the trunk compartment 12, alternative embodiments may locate the system in other areas of the vehicle. For example:

In large SUVs or vans, the system may be installed in a rear corner with a permanent privacy partition.

In pickup trucks, the system may be installed in the truck bed under a camper shell or tonneau cover.

In passenger vans or shuttle buses, the system may be installed in a dedicated rear section or in place of one or more rear seats.

The toilet 14 itself may vary in design. Options include standard flush toilets, composting toilets that process waste into compost material, incinerating toilets that burn waste to ash, or chemical toilets that use chemical agents to break down and neutralize waste.

The waste management approach may also vary. Instead of a holding tank, some embodiments may use disposable cartridges, biodegradable bags, or direct-discharge systems (where legally and environmentally permissible).

The water supply may be enhanced with a filtration or purification system to ensure potable water is available for hand-washing. Alternatively, a separate water reservoir containing pre-treated or sterile water may be used specifically for the sink.

Power sources for electrical components may include the vehicle's primary battery, an auxiliary battery, solar panels mounted on the vehicle roof, or a portable generator.

It should be understood that the foregoing relates to exemplary embodiments of the invention and that modifications may be made without departing from the spirit and scope of the invention as set forth in the following claims.

What is claimed is:

1. A vehicle-integrated-biodegradable sanitation system, comprising:

a vehicle including a trunk compartment;

a toilet disposed within the trunk compartment and configured to receive waste material from a user, wherein the toilet is configured to fold into a recessed well in the trunk compartment when not in use;

a waste tank fluidly connected to the toilet and configured to receive and store the waste material, the waste tank configured to accept disposable biodegradable waste bags;

a flush mechanism operably connected to the toilet and configured to transfer the waste material from the toilet to the waste tank; and a filter positioned to filter air from the waste tank to reduce odor emissions.

2. A vehicle-integrated-biodegradable sanitation system, comprising:

a vehicle including a trunk compartment;

a toilet disposed within the trunk compartment and configured to receive waste material from a user;

a waste tank fluidly connected to the toilet and configured to receive and store the waste material, wherein the waste tank is removable from the vehicle for off-site disposal, the waste tank configured to accept disposable biodegradable waste bags;

a flush mechanism operably connected to the toilet and configured to transfer the waste material from the toilet to the waste tank; and a filter positioned to filter air from the waste tank to reduce odor emissions.

3. A vehicle-integrated-biodegradable sanitation system, comprising:

a vehicle including a trunk compartment;

a toilet disposed within the trunk compartment and configured to receive waste material from a user;

a waste tank fluidly connected to the toilet and configured to receive and store the waste material, the waste tank configured to accept disposable biodegradable waste bags, wherein the waste tank comprises a drain port configured to connect to a disposal hose;

a flush mechanism operably connected to the toilet and configured to transfer the waste material from the toilet to the waste tank; and a filter positioned to filter air from the waste tank to reduce odor emissions.

4. A vehicle-integrated-biodegradable sanitation system, comprising:

a vehicle including a trunk compartment;

a toilet disposed within the trunk compartment and configured to receive waste material from a user;

a waste tank fluidly connected to the toilet and configured to receive and store the waste material, the waste tank configured to accept disposable biodegradable waste bags;

a flush mechanism operably connected to the toilet and configured to transfer the waste material from the toilet to the waste tank; and a filter positioned to filter air from the waste tank to reduce odor emissions, wherein the filter comprises an activated carbon filter.

5. A vehicle-integrated-biodegradable sanitation system, comprising:

a vehicle including a trunk compartment;

a toilet disposed within the trunk compartment and configured to receive waste material from a user, wherein the toilet comprises a folding mechanism including at least one of a hinge, a pivot, and a sliding track;

a waste tank fluidly connected to the toilet and configured to receive and store the waste material, the waste tank configured to accept disposable biodegradable waste bags;

a flush mechanism operably connected to the toilet and configured to transfer the waste material from the toilet to the waste tank; and a filter positioned to filter air from the waste tank to reduce odor emissions.

6. A vehicle-integrated sanitation system for biodegradable waste management, comprising:

a motor vehicle having a cargo area;

a toilet assembly positioned within the cargo area, the toilet assembly configured to transition between a deployed configuration and a stored configuration;

a waste collection tank fluidly coupled to the toilet assembly and configured to store waste material received from the toilet assembly;

a water supply subsystem configured to provide water to the toilet assembly for flushing; and an odor mitigation subsystem comprising a filter element positioned to filter air discharged from the waste collection tank.

7. The system of claim 6, further comprising a hygiene station disposed adjacent to the toilet assembly, the hygiene station comprising a sink and a water supply.

8. The system of claim 6, wherein the toilet assembly comprises a folding structure configured to retract into a recessed compartment formed in a floor of the cargo area.

9. The system of claim 6, wherein the waste collection tank is configured to accept disposable waste bags.

10. The system of claim 6, further comprising a privacy structure deployable around the toilet assembly, the privacy structure comprising at least one flexible panel configured to enclose the toilet assembly when in use.

* * * * *